US012348504B2

(12) United States Patent
Lewis et al.

(10) Patent No.: US 12,348,504 B2
(45) Date of Patent: *Jul. 1, 2025

(54) PASSING AUTHENTICATION INFORMATION VIA PARAMETERS

(71) Applicant: GOOGLE LLC, Mountain View, CA (US)

(72) Inventors: Justin Lewis, Marina Del Rey, CA (US); Abhiram Kasina, San Bruno, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/733,367

(22) Filed: Jun. 4, 2024

(65) Prior Publication Data

US 2024/0323178 A1    Sep. 26, 2024

Related U.S. Application Data

(63) Continuation of application No. 17/578,440, filed on Jan. 18, 2022, now Pat. No. 12,041,045, which is a
(Continued)

(51) Int. Cl.
*H04L 9/40* (2022.01)
*H04L 67/01* (2022.01)
(Continued)

(52) U.S. Cl.
CPC ........ *H04L 63/0815* (2013.01); *H04L 63/062* (2013.01); *H04L 63/083* (2013.01);
(Continued)

(58) Field of Classification Search
CPC ... G06F 21/41; H04L 63/062; H04L 63/0815; H04L 63/083; H04L 67/01; H04L 67/02;
(Continued)

(56) References Cited

U.S. PATENT DOCUMENTS 8,095,972 B1 *  1/2012  Floyd .................. G06F 16/9574
                                              726/9
11,228,579 B2    1/2022  Lewis et al.
(Continued)

FOREIGN PATENT DOCUMENTS

EP         3094064 A1    11/2016
JP      2013-149238 A     8/2013
(Continued)

OTHER PUBLICATIONS

Examination Report for IN Appln. Ser. No. 201927028983 dated Mar. 9, 2021 (7 pages).
(Continued)

*Primary Examiner* — Gil H. Lee
(74) *Attorney, Agent, or Firm* — MARSHALL, GERSTEIN & BORUN LLP

(57) ABSTRACT

Systems and methods for passing account authentication information via parameters. A server can provide, to a client device, an account parameter derived from an account credential used to authenticate a first application to insert into a link. The link can include an address referencing a second application. The account parameter can be passed from the first application to the second application responsive to an interaction on the link. The server can receive from the second application of the client device, subsequent to passing the account parameter from the first application to the second application, a request to authenticate the second application including the account parameter. The server can authenticate the client device for the second application using the account parameter. The server can transmit, responsive to authenticating the client device for the second application, an authentication indication to the second application of the client device.

19 Claims, 8 Drawing Sheets

Related U.S. Application Data continuation of application No. 16/487,783, filed as application No. PCT/US2017/066610 on Dec. 15, 2017, now Pat. No. 11,228,579.

(60) Provisional application No. 62/486,852, filed on Apr. 18, 2017.

(51) Int. Cl.
  *H04L 67/02* (2022.01)
  *H04L 67/125* (2022.01)
  *H04L 67/568* (2022.01)
  *H04W 12/06* (2021.01)

(52) U.S. Cl.
  CPC .............. *H04L 67/01* (2022.05); *H04L 67/02* (2013.01); *H04L 67/125* (2013.01); *H04L 67/568* (2022.05); *H04W 12/06* (2013.01)

(58) Field of Classification Search
  CPC ..... H04L 67/125; H04L 67/568; H04L 69/40; H04W 12/06
  See application file for complete search history.

(56) References Cited

U.S. PATENT DOCUMENTS

| | | | |
|---|---|---|---|
| 2014/0082715 A1 | 3/2014 | Grajek et al. | |
| 2014/0223527 A1* | 8/2014 | Bortz | H04L 63/08 |
| | | | 726/6 |
| 2016/0180333 A1* | 6/2016 | Leyva | G06Q 20/363 |
| | | | 705/41 |

FOREIGN PATENT DOCUMENTS

| | | |
|---|---|---|
| KR | 10-0653040 B1 | 12/2006 |
| KR | 2014-0110540 A | 9/2014 |

OTHER PUBLICATIONS

International Preliminary Report on Patentability on Appln. Ser. No. PCT/US2017/066610 dated Oct. 21, 2019 (11 pages).
International Search Report and Written Opinion on Appln. Ser. No. PCT/US2017/066610 dated Mar. 1, 2018 (16 pages).
Office Action for CN Appln. Ser. No. 201780074297.8 dated Dec. 31, 2020 (8 pages).
Office Action for KR Appln. Ser. No. 10-2019-7023279 dated Jan. 18, 2021 (7 pages).
Office Action for KR Appln. Ser. No. 10-2019-7023279 dated Jul. 20, 2020 (17 pages).
Reasons for Rejection for JP Appln. Ser. No. 2019-541289 dated Oct. 19, 2020 (5 pages).

* cited by examiner

PASSING AUTHENTICATION INFORMATION VIA PARAMETERS

CROSS-REFERENCE TO RELATED APPLICATIONS

This application is a continuation of U.S. patent application Ser. No. 17/578,440, entitled "Passing Authentication Information via Parameters" and filed on Jan. 18, 2022, which is a continuation of U.S. patent application Ser. No. 16/487,783, entitled "Passing Authentication Information via Parameters" and filed on Aug. 21, 2019, which is a national stage entry of PCT Application No. PCT/US2017/066610, entitled "Passing Authentication Information via Parameters" and filed on Dec. 15, 2017, which claims priority to U.S. Provisional Application No. 62/486,852, entitled "Passing Along Authentication Information via Parameters" and filed on Apr. 18, 2017. Each of these applications is hereby incorporated herein by reference in its entirety.

BACKGROUND

To access an application, a user of a client device may enter login information (e.g., account identifier and password). The client device may execute multiple applications. These multiple applications in turn may be associated with multiple accounts used by multiple users.

SUMMARY

At least one aspect is directed to a method of passing account authentication information via parameters. An authentication server having one or more processors can provide, to a client device, an account parameter derived from an account credential used to authenticate a first application executing on the client device to insert into a link. The link can include an address referencing a second application executable on the client device. The account parameter can be passed from the first application to the second application responsive to an interaction on the link. The authentication server can receive, from the second application of the client device, subsequent to passing the account parameter from the first application to the second application, a request to authenticate the second application. The request can include the account parameter. The authentication server can authenticate the client device for the second application using the account parameter provided to the first application and passed via the link to the second application. The authentication server can transmit, based on authenticating the client device for the second application, an authentication indication identifying one of success or failure of authentication of the client device for the second application.

In some implementations, providing the account parameter can further include providing the account parameter derived from the account credential using a two-way encryption algorithm. In some implementations, authenticating the client device for the second application can further include recovering the account credentials by applying the two-way encryption algorithm to the account parameter included in the request to authenticate.

In some implementations, providing the account parameter can further include providing the account parameter derived from the account credential using a one-way encryption algorithm. In some implementations, authenticating the client device for the second application can further include determining that a second account parameter separately derived from the account credential using the one-way encryption algorithm matches the account parameter included in the request to authenticate.

In some implementations, authenticating the client device for the second application can further include determining that the account parameter included in the request to authenticate matches the account parameter stored in a cache. In some implementations, providing the account parameter can further include providing the account parameter passed from the first application to the second application responsive to the interaction on the link via at least one of a link parameter of the link and of a function call by a platform application running on the client device.

In some implementations, receiving the request to authenticate can further include receiving the request to authenticate from the second application of the client device via an application server associated with the second application. In some implementations, transmitting authentication indication can further include transmitting authentication indication to the second application of the client device via the application server associated with the second application. In some implementations, providing the account parameter can further include providing the account parameter included in the link. The link can include the address referencing the second application. The interaction on the link can cause the client device to install the second application and to pass the account parameter to the second application subsequent to installation of the second application.

In some implementations, the authentication server can generate the account parameter based on the account credential used to authenticate the first application executing on the client device. In some implementations, providing the account parameter can further include providing the link including the account parameter and the address referencing the second application, responsive to generating the account parameter. In some implementations, transmitting authentication indication can further include transmitting the authentication indication including account settings for the second application corresponding to the authentication credentials. Receipt of the account settings can cause the client device to apply the account settings for the second application.

At least one aspect is directed to a system for passing account authentication information via parameters. The system can include an authenticator executed on an authentication server having one or more processors. The authenticator can provide, to a client device, an account parameter derived from an account credential used to authenticate a first application executing on the client device to insert into a link. The link can include an address referencing a second application executable on the client device. The account parameter can be passed from the first application to the second application responsive to an interaction on the link. The authenticator can receive, from the second application of the client device, subsequent to passing the account parameter from the first application to the second application, a request to authenticate the second application. The request can include the account parameter. The authenticator can authenticate the client device for the second application using the account parameter provided to the first application and passed via the link to the second application. The authenticator can transmit, based on the authentication of the client device for the second application, an authentication indication identifying one of success or failure of authentication of the client device for the second application.

In some implementations, the authenticator can provide the account parameter derived from the account credential using a two-way encryption algorithm. In some implementations, the authenticator can authenticate the client device for the second application by recovering the account credentials by applying the two-way encryption algorithm to the account parameter included in the request to authenticate.

In some implementations, the authenticator can provide the account parameter derived from the account credential using a one-way encryption algorithm. In some implementations, the authenticator can authenticate the client device for the second application by determining that a second account parameter separately derived from the account credential using the one-way encryption algorithm matches the account parameter included in the request to authenticate.

In some implementations, the authenticator can authenticate the client device for the second application by determining that the account parameter included in the request to authenticate matches the account parameter stored in a cache. In some implementations, the authenticator can provide the account parameter passed from the first application to the second application responsive to the interaction on the link via at least one of a link parameter of the link and of a function call by a platform application running on the client device.

In some implementations, the authenticator can receive the request to authenticate from the second application of the client device via an application server associated with the second application. In some implementations, the authenticator can transmit the authentication indication to the second application of the client device via the application server associated with the second application. In some implementations, the authenticator can provide the account parameter included in the link. The link can include the address referencing the second application. The interaction on the link can cause the client device to install the second application and to pass the account parameter to the second application subsequent to installation of the second application.

In some implementations, the authenticator can generate the account parameter based on the account credential used to authenticate the first application executing on the client device. In some implementations, the authenticator can provide the link including the account parameter and the address referencing the second application, responsive to the generation of the account parameter. In some implementations, the authenticator can transmit the authentication indication including account settings for the second application corresponding to the authentication credentials. Receipt of the account settings can cause the client device to apply the account settings for the second application.

At least one aspect is directed to a non-transitory computer readable medium storing instructions for passing account authentication information that upon execution causes one or more processors to perform operations. The operations can include providing, to a client device, an account parameter derived from an account credential used to authenticate a first application executing on the client device to insert into a link. The link can include an address referencing a second application executable on the client device. The account parameter can be passed from the first application to the second application responsive to an interaction on the link. The operations can include receiving, from the second application of the client device, subsequent to passing the account parameter from the first application to the second application, a request to authenticate the second application. The request can include the account parameter. The operations can include authenticating the client device for the second application using the account parameter provided to the first application and passed via the link to the second application. The operations can include transmitting, based on the authentication of the client device for the second application, an authentication indication identifying one of success or failure of the authentication of the client device for the second application.

In some implementations, the operations can further include providing the account parameter included in the link. The link can include the address referencing the second application. The interaction on the link can cause the client device to install the second application and to pass the account parameter to the second application subsequent to installation of the second application.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
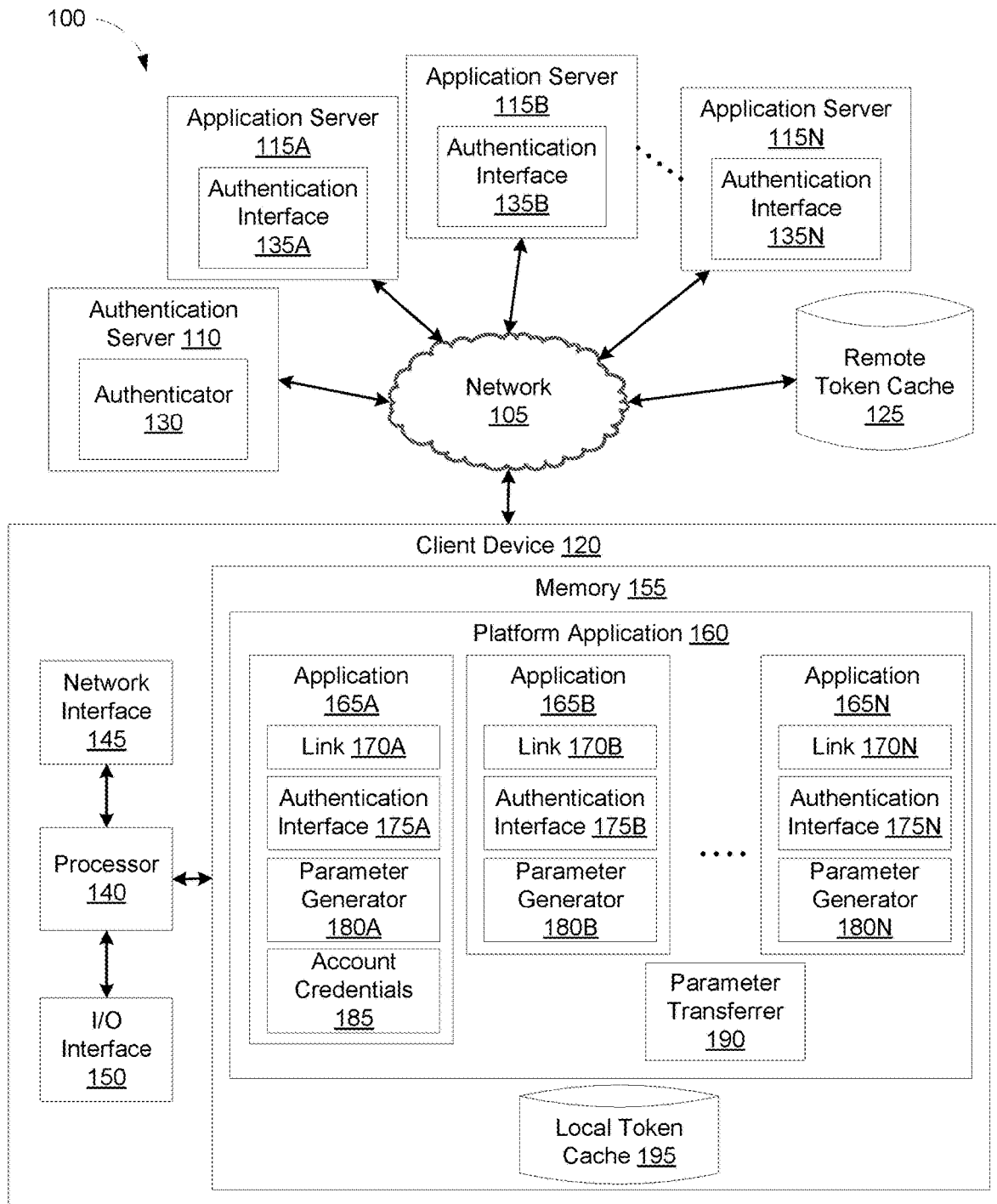
FIG. 1 is a block diagram depicting a computer networked environment for passing account authentication information via parameters, according to an illustrative implementation.

Following below are more detailed descriptions of various concepts related to, and implementations of, methods, apparatuses, and systems of passing account authentication information via parameters. The various concepts introduced above and discussed in greater detail below may be implemented in any of numerous ways, as the described concepts are not limited to any particular manner of implementation.

A link to another application may be provided to one application running on a client device associated with a single account or multiple accounts ("shared device"). For instance, a link to open or install a music application may be provided on a video-sharing website. At present, when a user clicks on such a link on the first application, the client device may be seamlessly directed to the second application. This sometimes seamless transition from the first application to the second application may lead to confusion on the part of the user as to which account the user is signed onto and may erroneously or inadvertently gain access to another account as a result. For instance, the user using the first application and then the second application may unintentionally publicize activities on the second application. These privacy and security issues may be of greater concern with multiple accounts signed onto a single client device, especially when the user operates the second application at a much later time after the first application.

To address these and other technical problems, the present disclosure leverages the URL authentication token to pass account information across various applications. The client device can pass encoded user account information by embedding the encoded account information in a URL of a link or by passing the encoded account information via an activity function call (e.g., ANDROID Intents function call). The applications executing on the client device may share the account information in potentially at least three techniques.

Under a first implementation, an external account credential used by the first application may be obfuscated using a two-way encryption function ("bi-obfuscated"). The obfuscated identifier may be embedded into a URL linking to the second application or may be passed via the activity function call. Once received from the first application, the second application may recover the original account credential from the obfuscated identifier using the two-way encryption function. Having verified the account identifier, the second application may automatically log in the user to an account in the second application that corresponds to the identifier. In the event that the second application does not include an account corresponding to that identifier, the second application may block the user from logging into that application, or else may request further information from the user (such as details of an alternative user account) before the user can log in to the second application.

In a second implementation, an account credential used to login to the first application may be encrypted using a fingerprinting function. Unlike the first implementation, this encrypted identifier may be unrecoverable, as the fingerprint function is a one-way encryption function. The second application may have its own copy of the encrypted identifier for the same account, or otherwise may have access to the encrypted identifier. The same account may refer to an account registered to, the same user). With the receipt of the encrypted identifier from the first application, the second application may compare the two encrypted identifiers to see whether these identifiers match. Once a match is found, the second application may log in the user to the account having the matching identifier. In the event that the second application does not include an account having a matching identifier or the account having the matching identifier is not among those that are checked by the second application, the second application may block the user from logging into that application or else may request further information from the user (such as details of an alternative user account) before the user can log in to the second application.

According to a third implementation, there may be a shared backend cache between the two applications to store a token for the user's account in each application. The token may be embedded into the URL appearing on the first application to link to the second application. Upon a request for the second application from the first application, the second application may access the shared backend to retrieve the token for the user's account. Using the retrieved token, the user may be automatically logged into the user's account in the second application.

FIG. 1 is a block diagram depicting one implementation of an environment for passing account authentication information via parameters. The environment 100 may include at least one authentication server 110 connected to at least one client device 120 via the network 105. In some implementations, the environment 100 may include at least one application server 115A-115N connected to at least one client 120 via the network 105. In some implementations, the at least one authentication server 110 may be connected to at least one application server 115A-115N. In some implementations, the environment 100 may include a remote token cache 125 connected to at least one authentication server 110 or at least one application server 115A-115N. In some implementations, the environment 100 may include a content provider device and a content publisher device connected to the network 105.

In further detail, the authentication server 110 can include at least one processor and a memory, i.e., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system can include one or more computing devices or servers that can perform various functions. In some implementations, the data processing system can include a content placement system configured to host auctions. In some implementations, the data processing system does not include the content placement system but is configured to communicate with the content placement system via the network 105.

The network 105 can include computer networks such as the Internet local, wide, metro or other area networks, intranets, satellite networks, other computer networks such as voice or data mobile phone communication networks, and combinations thereof. The authentication server 110 of the system 100 can communicate via the network 105, for instance with at least one application server 115A-115N and at least one client device 120. The network 105 may be any form of computer network that relays information between the client device 120, authentication server 110, and one or more content sources, such as web servers, amongst others. In some implementations, the network 105 may include the Internet and/or other types of data networks, such as a local area network (LAN), a wide area network (WAN), a cellular network, a satellite network, or other types of data networks. The network 105 may also include any number of computing devices (e.g., computers, servers, routers, network switches, etc.) that are configured to receive and/or transmit data within the network 105. The network 105 may further include any number of hardwired and/or wireless connections. The client device 120 may communicate wirelessly (e.g., via WiFi, cellular, radio, etc.) with a transceiver that is hardwired (e.g., via a fiber optic cable, a CAT5 cable, etc.) to other computing devices in the network 105. The client device 120 may also communicate wirelessly with the computing devices of the network 105 via a proxy device (e.g., a router, network switch, or gateway).

The client devices 120 can include computing devices configured to communicate via the network 105 to display data such as the content provided by a content publisher device (e.g., primary webpage content or other information resources) and the content provided by a content provider device (e.g., content elements configured for display in an information resource). The client device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The client device 120 can be a communication device through which an end user can submit requests to receive content. The requests can be requests to a search engine, and the requests can include search queries. In some implementations, the requests can include a request to access a webpage.

The client device 120 can include a processor and a memory, i.e., a processing circuit. The memory stores machine instructions that, when executed by processor, cause processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language.

The client device 120 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the client device 120 (e.g., a built-in display, microphone, etc.) or external to the housing of the client device 120 (e.g., a monitor connected to the client device 120, a speaker connected to the client device 120, etc.). In some implementations, the client device 120 may include an electronic display, which visually displays webpages using webpage data received from one or more content sources and/or from the content publisher device or the content provider device via the network 105.

The authentication server 110 can include at least one server. The authentication server 110 may operate as a central authentication authority for the various applications executing at the client device 120. In some implementations, the authentication server 110 can include a plurality of servers located in at least one data center or server farm. In some implementations, the remote token cache 125 may be part of the authentication server 110. The authentication server 110 can include at least one authenticator 130. The authenticator 130 can include at least one processing unit, server, virtual server, circuit, engine, agent, appliance, or other logic device such as programmable logic arrays configured to communicate with a database a and with other computing devices (e.g., the application server 115A-115N, the client device 120, and the remote token cache 125) via the network 105. The authenticator 130 can include or execute at least one computer program or at least one script. The authenticator 130 can include combinations of software and hardware, such as one or more processors configured to execute one or more scripts.

The authenticator 130 of the authentication server 110 can receive a request to authenticate from the client device 120 or other application servers 115A-115N. The request to authenticate can include account credentials. The account credentials can include an account identifier, an account access code, and other encryption parameters, among others. The authenticator 130 can identify the account identifier and the account access code. The authenticator 130 can compare account access code with previously stored account access code for the identifier account identifier. If the access codes match, the authenticator 130 can authenticate the account credentials and transmit a confirmation of authentication to the client device 120 or other application servers 115A-115N that transmitted the request to authenticate. If the access codes do not match, the authenticator 130 can transmit an indication of failure to authenticate to the client device 120 or other application servers 115A-115N that transmitted the request to authenticate. The functionality of the authenticator 130 in context of the environment 100 will be detailed herein below.

The application server 115A-115N can include at least one server. The application server 115A-115N can exchange data with the client device 120 for the various applications executing at the client device 120. In some implementations, the application server 115A-115N can include a plurality of servers located in at least one data center or farm. In some implementations, the remote token cache 125 may be part of the authentication server 110. The application server 115A-115N may include at least one server-side authentication interface 135A-135N. The server-side authentication interface 135A-135N can include at least one processing unit, server, virtual server, circuit, engine, agent, appliance, or other logic device such as programmable logic arrays configured to communicate with a database a and with other computing devices (e.g., the application server 115A-115N, the client device 120, and the remote token cache 125) via the network 105. The authentication interface 135A-135N can include or execute at least one computer program or at least one script. The authentication interface 135A-135N can include combinations of software and hardware, such as one or more processors configured to execute one or more scripts. The functionality of the authentication interface 135A-135N is detailed herein below.

The client device 120 can include a processor 140, a network interface 145, an input/output (I/O) interface 150, and memory 155. The processor 140, the network interface 145, the I/O interface 150, and the memory 155 may be components described herein in conjunction with FIG. 5. The memory 155 can include a platform application 160, such as an operating system or a web browser, or any other computer program capable of executing or otherwise invoking other computer-executable instructions processed by the client device 120. The platform application 160 can include one or more applications 165A-165N. In some implementations, each application 165A-165N may be an information resource (e.g., webpage). In some implementations, each application 165A-165N may be a separate computer-executable processed by the platform application 160. Each application 165A-165N may include a link 170A-170N, a client-side authentication interface 175A-175N, and a parameter generator 180A-180N. In some implementations, the platform application 160 can include a parameter transferrer 190. In some implementations, the platform application 160 can include a local token cache 195. At least one application 165A may include account credentials 185, while the other applications 165B-165N may lack the account credentials 185. The account credentials 185 can include the account identifier, the account access code, and other encryption parameters, among others. The at least one of the applications 165A-165N may have account credentials 185 authenticated or otherwise verified with the authenticator 130 of the authentication server 110 or the server-side authentication interface 135A-135N of the application server 115A-115N. At least one of the other applications 165A-165N may lack account credentials 185, and may yet to be authenticated or otherwise verified with the authenticator 130 of the authentication server 110 or the server-side authentication interface 135A-135N of the application server 115A-115N. In some implementations, the authentication interface 175A-175N of the application 165A-165N may transmit, to the authentication server 110 or to the corresponding application server 115A-115N, the account credentials 185. For example, a user of the client device 120 may have entered the account identifier and the account access code (e.g., password or personal identification number (PIN)) on a graphical user interface for the application 165A. Upon interaction with a submit button, the application 165A may send the account identifier and the account access code as part of the account credentials 185 for authentication with the authentication server 110.

With receipt of the account credentials 185, the authenticator 130 of the authentication server 110 can parse the account credentials 185 to identify the account identifier and the access code, among others. The authenticator 130 can compare the access code from the application 165A-165N with the access code stored at the authentication server 110 for the account identifier. If there is no match between the two access codes, the authenticator 130 can transmit an indication of failure to authenticate to the application 165A-165N from which the account credentials 185 were received. If there is a match between the two access codes, the authenticator 130 can authenticate or otherwise verify the account credentials 185 for the application 165A-165N from which the account credentials 185 were received. The authenticator 130 in turn can transmit an indication of successful authentication to the corresponding application 165A-165N. With the account credentials 185 having been successfully authenticated, the authenticator 130 or the respective application 165A-165N can derive an account parameter from the account credentials 185 in the manner detailed below.

With respect to the applications 165A-165N initially without the account credentials 185, the authentication interface 175A-175N of each of the applications 165A-165N can be especially configured to receive the account credentials 185 via the link 170A-175N using the parameter transferrer 190 as detailed below. In some implementations, the authentication interface 175A-175N of each application 165A-165N can use an application programming interface to parse or recover the account credentials 185. The application programming interface may include definitions and protocols for communicating or relaying data (e.g., account credentials 185 or account parameter derived from the account credentials 185) about the applications 165A-165N. In some implementations, the authentication interface 175A-175N of each application 165A-165N can use the application programming interface to authenticate the application 165A-165N with the account credentials 185 of another application 165A-165N. In some implementations, the authentication interface 175A-175N of each application 165A-165N can use the application programming interface to interface or communicate with the authenticator 130 of the authentication server 110. More details regarding the functionality of the authentication interface 175A-175N of each of the applications 165A-165N are explained below.

Each application 165A-165N may be associated with one of the application servers 115A-115N. In some implementations, each application 165A-165N may include a web application that may include an information resource (e.g., a webpage) or one or more information resources for particular domain. In some implementations, each application 165A-165N may otherwise be an instance of a computer program, computer readable instructions, or executable provided by the respective application server 115A-115N. In some implementations, some of the applications 165A-165N may yet to be installed on the client device 120. In some implementations, the application server 115A-115N or the application distribution server may provide the application 165A-165N responsive to a request from the client device 120. In some implementations, some of the applications 165A-165N may already have been installed on the client device 120. Each application 165A-165N may be in communication with one of the application servers 115A-115N via the network 105. The data to be provided to each application 165A-165N may be managed by the respective application server 115A-115N. Each application 165A-165N may be provided to the client device 120 by the application server 115A-115N. Each application 165A-165N may be provided to the client device 120 by a centralized server (e.g., an application distribution server).

Each application 165A-165N can include at least one link 170A-170N (e.g., a hyperlink). In some embodiments, each application 165A-165N can include one or more information resources (e.g., webpages). At least one of the one or more information resources may include the link 170A-170N. Each link 170A-170N may be a reference mechanism to a particular information resource within the same application 165A-165N. Each link 170A-170N may also be a reference mechanism to the specified application (e.g., application 165A-165N). Each link 170A-170N may include a protocol (e.g., Hypertext Transfer Protocol) and an address with a hostname and a pathname (e.g., Uniform Resource Locator (URL) or Uniform Resource Identifier (URI)). The address of each link 170A-170N can reference another application 165A-165N. In some implementations, each link 170A-170N may also include a link parameter (e.g., a URL parameter such as a query string). The link parameter may include an account parameter. The account parameter may be used by the application 165A-165N to pass along authentication credentials 185 to another application 165A-165N. The account parameter may be generated from the account credentials 185, and may be of various types. The type of account parameter generated and used may be pre-set by the application 165A-165N or may be determined in accordance to a parameter type policy. In some implementations, the account parameter may be generated and may be provided by the application server 115A-115N associated with the application 165A-165N. In some implementations, the account parameter may be generated and may be provided by the authentication server 110. In some implementations, the account parameter may be generated at the client device 120 by the parameter generator 180A-180N.

In some implementations, the account parameter can include an obfuscation of the account credentials 185. The obfuscation of the account credentials 185 can be generated by the authentication server 110, the application server 115A-115N, or the parameter generator 180 of the client device 120. The obfuscation of the account credentials 185 may include an alphanumerical value. The obfuscation of the account credentials 185 may be provided by the authentication server 110 or the application server 115A-115N as part of the parameter of the link 170A-170N. The obfuscation of the account credentials 185 may be generated by the parameter generator 180 of the client device, upon interaction with the link 170A-170N. The obfuscation can be generated using a two-way encryption function, such as a cryptographic hashing function. The two-way encryption function may be applied onto a combination of the account identifier, the account access code, and/or the other encryption parameters. By obfuscating the account credentials 185 with a two-way encryption function, the account credentials 185 may be later recovered from the account parameter by reapplying the same two-way encryption function.

In some implementations, the account parameter can include a fingerprint of the account credentials 185. The fingerprint of the account credentials 185 can be generated by the authentication server 110, the application server 115A-115N, or the parameter generator 180 of the client device 120. The fingerprint of the account credentials 185 may include an alphanumerical value. The fingerprint of the account credentials 185 may be provided by the authentication server 110 or the application server 115A-115N as part of the parameter of the link 170A-170N. The fingerprint of the account credentials 185 may be generated by the parameter generator 180 of the client device, upon interaction with the link 170A-170N. The fingerprint can be generated using a one-way encryption function, such as a fingerprinting algorithm. The one-way encryption function may be applied onto a combination of the account identifier, the account access code, and/or the other encryption parameters. Once generated, the fingerprint of the account credentials 185 may be stored on the memory 155, the application server 115A-115N, or the authentication server 110. By fingerprinting the account credentials 185 with a one-way encryption function, the original account credentials 185 may remain hidden from the other applications 165B-165N as well as other application servers 115B-115N or any other device connected to the network 105.

In some implementations, the account parameter can include a token corresponding to the account credentials 185. The token corresponding to the account credentials 185 can be generated by the authentication server 110, the application server 115A-115N, or the parameter generator 180 of the client device 120. The token corresponding to the account credentials 185 may include an alphanumerical value. The token may be provided by the authentication server 110 or the application server 115A-115N as part of the parameter of the link 170A-170N. The token corresponding to the account credentials 185 may be generated by the parameter generator 180 of the client device, upon interaction with the link 170A-170N. The token can be generated using a combination of the account identifier, the account access code, and/or the other encryption parameters. In some implementations, the token may then be stored at the local token cache 195 by the parameter generator 180A-180N. In some implementations, the token may be stored at the remote token cache 125 by the authentication server 110 or the application server 115A-115N. By generating a token from the account credentials 185, the original account credentials 185 may be retrieved from the local token cache 195 or the remote token cache 125 upon request.

Upon an interaction event with the link 170A-170N (e.g., click, hover-over, scroll, screen touch, etc.), the parameter transferrer 190 can pass the account parameter of the link 170A-170N from one application 165A-165N to the application 165A-165N referenced by the link 170A-170N. In some implementations, the parameter transferrer 190 can directly pass the account parameter via the link 170A-170N using deep linking techniques. The parameter transferrer 190 can parse the link 170A-170N to identify the application 165A-165N referenced by the address of the link 170A-170N. The platform application 160 can then execute the application 165A-165N corresponding to the address of the link 170A-170N. The parameter transferrer 190 can also parse the link 170A-170N to identify the link parameter of the link 170A-170N and may pass the link parameter of the link 170A-170N (along with the account parameter) to the application 165A-165N referenced by the link 170A-170N. In some implementations, the parameter transferrer 190 can pass the account parameter from one application 165A-165N to the other application 165A-165N referenced by the link 170A-170N using a function call, such as an activity function call (e.g., ANDROID Intent Function call). Once the account parameter is identified from the link 170A-170N, the parameter transferrer 190 can invoke the function call with the account parameter to relay or pass the account parameter to the application 165A-165N referenced by the link 170A-170N.

In some implementations, the parameter transferrer 190 can pass the account parameter via the link 170A-170N using deferred deep linking techniques. The link 170A-170N may correspond to a request to download and install the application 165A-165N on the client device 120. In some implementations, the parameter transferrer 190 can identify the link 170A-170N as a request to download and install the application 165A-165N. The parameter transferrer 190 can store the account parameter of the link 170A-170N on the memory 155. The parameter transferrer 190 can continuously monitor the progress of the downloading and installation of the application 165A-165N. Once the application 165A-165N is finished downloading, the platform application 160 can initiate execution of the application 165A-165N and the parameter transferrer 190 can pass the account parameter to the installed application 165A-165N.

In some implementations, responsive to the interaction event, the parameter generator 180A-180N can generate the account parameter using the techniques detailed herein above. The parameter generator 180A-180N can parse the link 170A-170N to determine whether the link 170A-170N includes the account parameter. If the link 170A-170N does not include the account parameter, the parameter generator 180A-180N can generate the account parameter using the techniques detailed herein above. If the link 170A-170N does include the account parameter, the parameter transferrer 190 can identify the account parameter and pass the account parameter to the application 165A-165N referenced by the link 170A-170N.

Once the authentication parameter is passed, the authentication interface 175A-175N of the application 165A-165N referenced by the link 170A-170N can initiate authentication with the server-side authentication interface 135A-135N of the authentication server 110. The server-side authentication interface 135A-135N in turn can continue the authentication with the authentication server 110 on behalf of the application 165A-165N of the client device 120. In some implementations, the application 165A-165N referenced by the link 170A-170N can initiate authentication directly with the authenticator 130 of the authentication server 110. The authentication interface 175A-175N can parse the account parameter to determine the parameter type of the account parameter received from the previously logged in application 165A-165N. In some implementations, the authentication interface 175A-175N can determine the parameter type by identifying length and data type (e.g., numeric, alphanumeric, etc.) of the account parameter, among others, and compare the identified length and data type to the length and data type specified for the parameter type. As described above, the parameter type may be the obfuscation of the account credentials 185, the fingerprinted account credentials 185, and the token corresponding to the account credentials 185, among others.

Figure 2A:
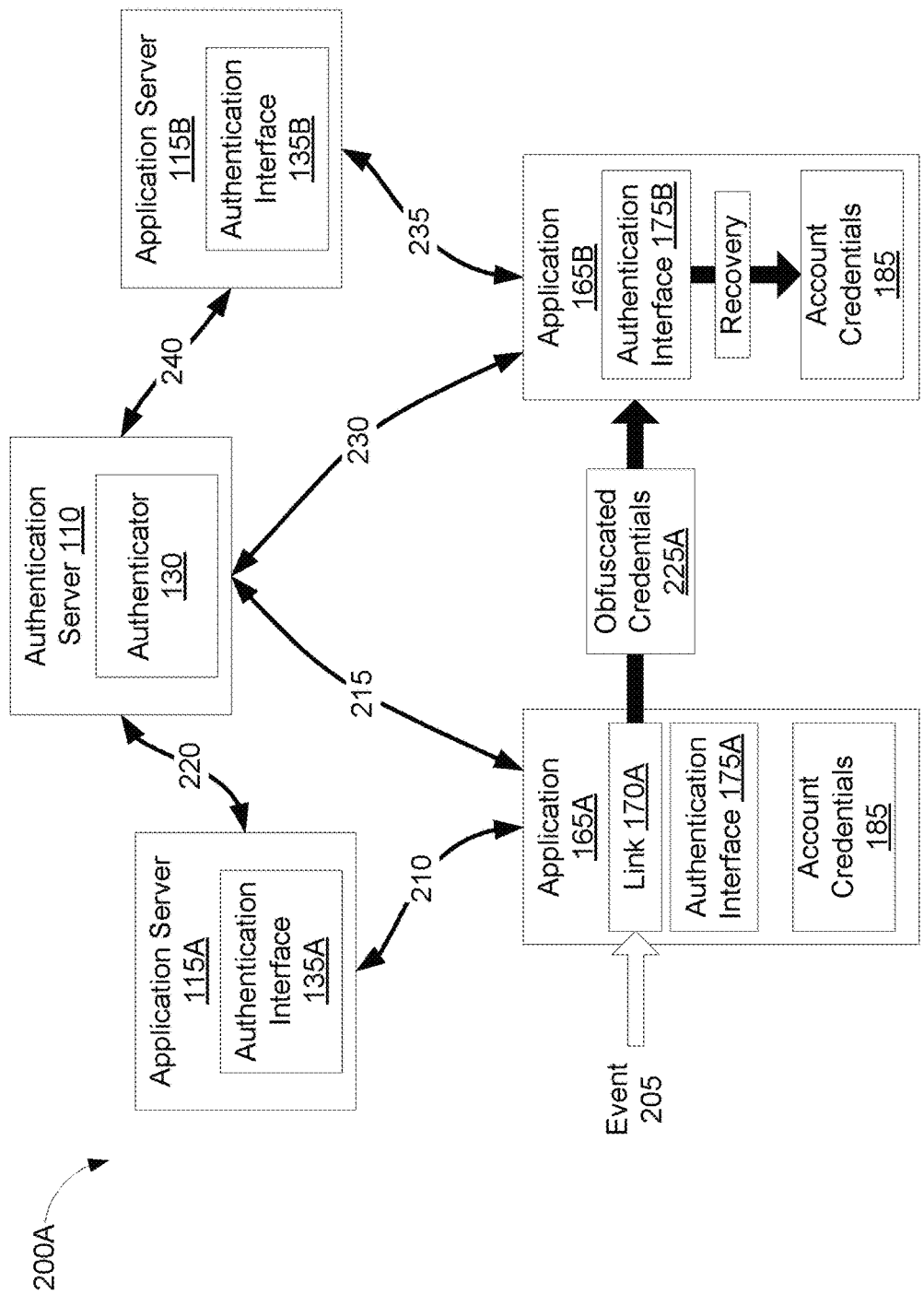
FIGS. 2A-2C are block diagrams each depicting a flow process of passing account authentication information via parameters, according to an illustrative implementation.

If the identified parameter type is the obfuscation of the account credentials 185, the original account credentials 185 can be recovered from the account parameter passed from the originally authenticated application 165A-165N. Now referring to FIG. 2A, depicted is an environment 200A for authenticating the account credentials 185 when the parameter type of the account parameter is obfuscated credentials 225A. The paths 210-240 may be communication links through the network 105. In the context of FIG. 1, the first application server 115A may have provided the application 165A to the client device 120 (via path 210). The first application 115A or the authentication server 110 may have provided the link 170A referencing the second application 165B (via path 210 or path 215). In some implementations, the account credentials 185 entered by the user of the client device 120 may be passed by the client-side authentication interface 175A to the first application server 115A (via path 210). The first server-side authentication interface 135A may then authenticate the account credentials 185 with the authentication server 110 (via path 220). The authenticator 130 of the authentication server 110 in turn may verify authentication of the account credentials 185 and may send a confirmation to the application server 115A (via path 220). The first authentication interface 135A of the application server 115A in turn may send the confirmation to the first application 165A (via path 210). In some implementations, the first application 165A of the client device 120 can send the account credentials 185 directly to the authentication server 110 (via path 215). The authenticator 130 of the authentication server 110 in turn can verify the authentication of the account credentials 185 and return a confirmation of authentication (via path 215).

When there is an event 205 (e.g., click, hover over, etc.) on the link 170A of the first application 165A, the parameter transferrer 190 can pass the obfuscated credentials 225A generated from the account credentials 185 to the second application 165B via URL parameter or via function call. In some implementations, the client-side authentication interface 175A-175N can recover the original account credentials 185 from the obfuscated credentials 225A using the two-way encryption algorithm. The two-way encryption algorithm may be the same as the one used to generate the account parameter. Once recovered, the client-side authentication interface 175B can send the account credentials 185 to the second application server 115B that manages the second application 165B (via path 235). The server-side authentication 135B of the second application server 115B can in turn send the recovered account credentials 185 with the authentication server 110 for authentication (via path 240).

Having received the account credentials 185 recovered from the obfuscated credentials 225A by the second application server 115B, the authentication server 110 can compare the authentication credential 185 with the account credential stored for the account identifier to determine whether there is a match. A match may be a one-to-one correspondence (e.g., character by character) between the recovered account credentials 185 and the account credential stored at the authentication server 110. If there is a match, the authenticator 130 of the authentication server 110 can send a confirmation message to the server-side authentication interface 135B of the second application server 115B (via path 240). The server-side authentication interface 135B of the second application server 115B can in turn send the confirmation to the second application 165B (via path 235). In some implementations, the confirmation message may be in the form of a response packet. On the other hand, if there is no match, the authenticator 130 of the authentication server 110 can send an indication of failure to the server-side authentication interface 135B of the second application server 115B (via path 240). In some implementations, the indication of failure may be in the form of a response packet. The server-side authentication interface 135B of the second application server 115B can in turn send the indication of failure to the second application 165B (via path 235).

In some implementations, the client-side authentication interface 175B can directly send the recovered account credentials 185 to the authentication server 110 (via path 240). Having received the account credentials 185 recovered from the obfuscated credentials 225A by the second application 165B, the authentication server 110 can compare the authentication credentials 185 with the account credential stored for the account identifier to determine whether there is a match. If there is a match, the authenticator 130 of the authentication server 110 can send a confirmation message to the server-side authentication interface 135B of the second application 165B (via path 235). On the other hand, if there is no match, the authenticator 130 of the authentication server 110 can send an indication of failure to the authentication interface 175B of the second application 165B (via path 235).

In some implementations, the client-side authentication interface 175A-175N can transmit the obfuscated credentials 225A to the authentication server 110 directly (via path 230). The authenticator 130 in turn can recover the original account credentials 185 from the obfuscated credentials 225A received from the second application 165B. Having recovered the account credentials 185 from the obfuscated credentials 225A, the authentication server 110 can compare the authentication credentials 185 with the account credential stored for the account identifier to determine whether there is a match. If there is a match, the authenticator 130 of the authentication server 110 can send a confirmation message to the client-side authentication interface 175B of the second application 165B (via path 230). On the other hand, if there is no match, the authenticator 130 of the authentication server 110 can send an indication of failure to the client-side authentication interface 175B of the second application 165B (via path 230).

In some implementations, the client-side authentication interface 175A-175N can transmit the obfuscated credentials 225A to the second application server 115B (via path 235). The server-side authentication 135B of the second application server 115B can in turn send the recovered account credentials 185 with the authentication server 110 for authentication (via path 240). Having received the obfuscated credentials 225A from the second application server 115B, the authentication server 110 can recover the account credentials 185 from the obfuscated credentials 225A. The authenticator 130 of the authentication server 110 can compare the authentication credential 185 with the account credential stored for the account identifier to determine whether there is a match. If there is a match, the authenticator 130 of the authentication server 110 can send a confirmation message to the server-side authentication interface 135B of the second application server 115B (via path 240). The server-side authentication interface 135B of the second application server 115B can in turn send the confirmation to the second application 165B (via path 235). On the other hand, if there is no match, the authenticator 130 of the authentication server 110 can send an indication of failure to the server-side authentication interface 135B of the second application server 115B (via path 240). The server-side authentication interface 135B of the second application server 115B can in turn send the indication of failure to the second application 165B (via path 235).

Figure 2B:
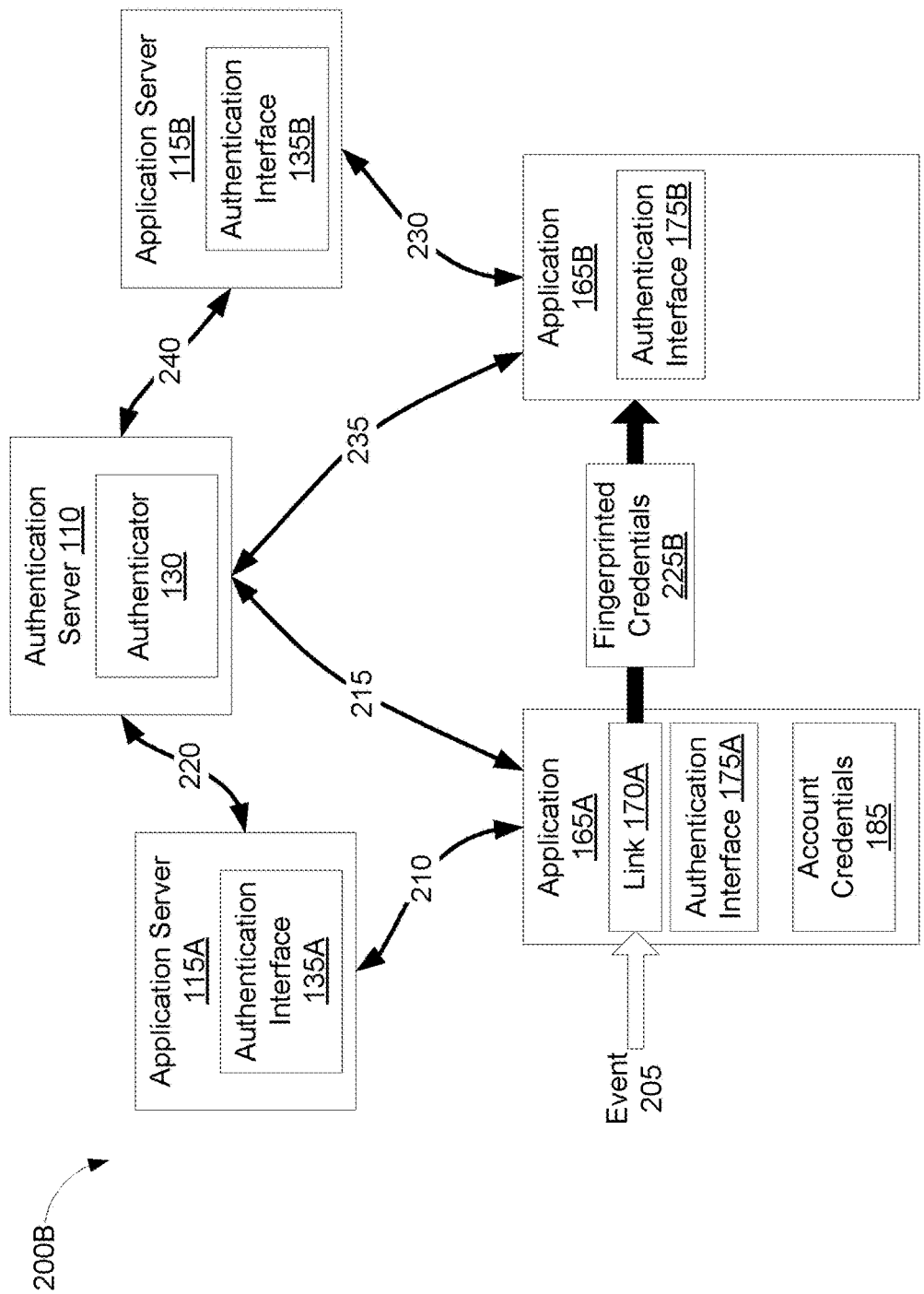

If the identified parameter type is the fingerprint of the account credentials 185, the fingerprint of the account credentials 185 passed through may be compared to previous fingerprints for authentication. Now referring to FIG. 2B, illustrated is an environment 200B for authenticating the account credentials 185 using fingerprinted credentials 225B. The paths 210-240 may be communication links through the network 105. In the context of FIG. 1, the first application server 115A may have provided the application 165A to the client device 120 (via path 210). The first application 115A or the authentication server 110 may have provided the link 170A referencing the second application 165B (via path 210 or path 215). In some implementations, the account credentials 185 entered by the user of the client device 120 may be passed by the client-side authentication interface 175A to the first application server 115A (via path 210). The server-side authentication interface 135A may then authenticate the account credentials 185 with the authentication server 110 (via path 220). The authenticator 130 of the authentication server 110 in turn may verify authentication of the account credentials 185 and may send a confirmation to the application server 115A (via path 220). The first authentication interface 135A of the application server 115A in turn may send the confirmation to the first application 165A (via path 210). In some implementations, the first application 165A of the client device 120 can send the account credentials 185 directly to the authentication server 110 (via path 215). The authenticator 130 of the authentication server 110 in turn can verify the authentication of the account credentials 185 and return a confirmation of authentication (via path 215). The authenticator 130 can also store the fingerprinted credentials 225B on the authentication server 110. In some implementations, the fingerprinted credentials 225B may be stored at the application servers 115A and 115B or at the client device 120 for the applications 165A and 165B.

Responsive to an event 205 on the link 170A on the first application 165A, the parameter transferrer 190 can pass the fingerprinted credentials 225B generated from the account credentials 185 to the second application 165B via URL parameter or via function call. The fingerprinted credentials 225B may be generated using a one-way encryption algorithm, and may be stored at the authentication server 110. The client-side authentication interface 175B can send the fingerprinted credentials 225B to the second application server 115B that manages the second application 165B (via path 235). Having received the fingerprinted credentials 225B from the second application server 115B, the authentication server 110 can compare the fingerprinted credentials 225B with the previously stored fingerprinted credentials to determine whether there is a match. If there is a match, the authenticator 130 of the authentication server 110 can send a confirmation message to the server-side authentication interface 135B of the second application server 115B (via path 240). The server-side authentication interface 135B of the second application server 115B can in turn send the confirmation to the second application 165B (via path 235). In some implementations, the confirmation message may be in the form of a response packet. On the other hand, if there is no match, the authenticator 130 of the authentication server 110 can send an indication of failure to the server-side authentication interface 135B of the second application server 115B (via path 240). In some implementations, the indication of failure may be in the form of a response packet. The server-side authentication interface 135B of the second application server 115B can in turn send the indication of failure to the second application 165B (via path 235).

In some implementations, the client-side authentication interface 175A-175N can transmit the fingerprinted credentials 225B to the authentication server 110 directly (via path 230). The authenticator 130 in turn can send the fingerprinted credentials 225B received from the second application 165B. Having received the fingerprinted credentials 225B, the authentication server 110 can compare the fingerprinted credentials 225B with the previously stored fingerprinted credentials to determine whether there is a match. If there is a match, the authenticator 130 of the authentication server 110 can send a confirmation message to authentication interface 175B of the second application 165B (via path 235). In some implementations, the confirmation message may be in the form of a response packet. On the other hand, if there is no match, the authenticator 130 of the authentication server 110 can send an indication of failure to the authentication interface 175B of the second application 165B (via path 230). In some implementations, the indication of failure may be in the form of a response packet.

Figure 2C:
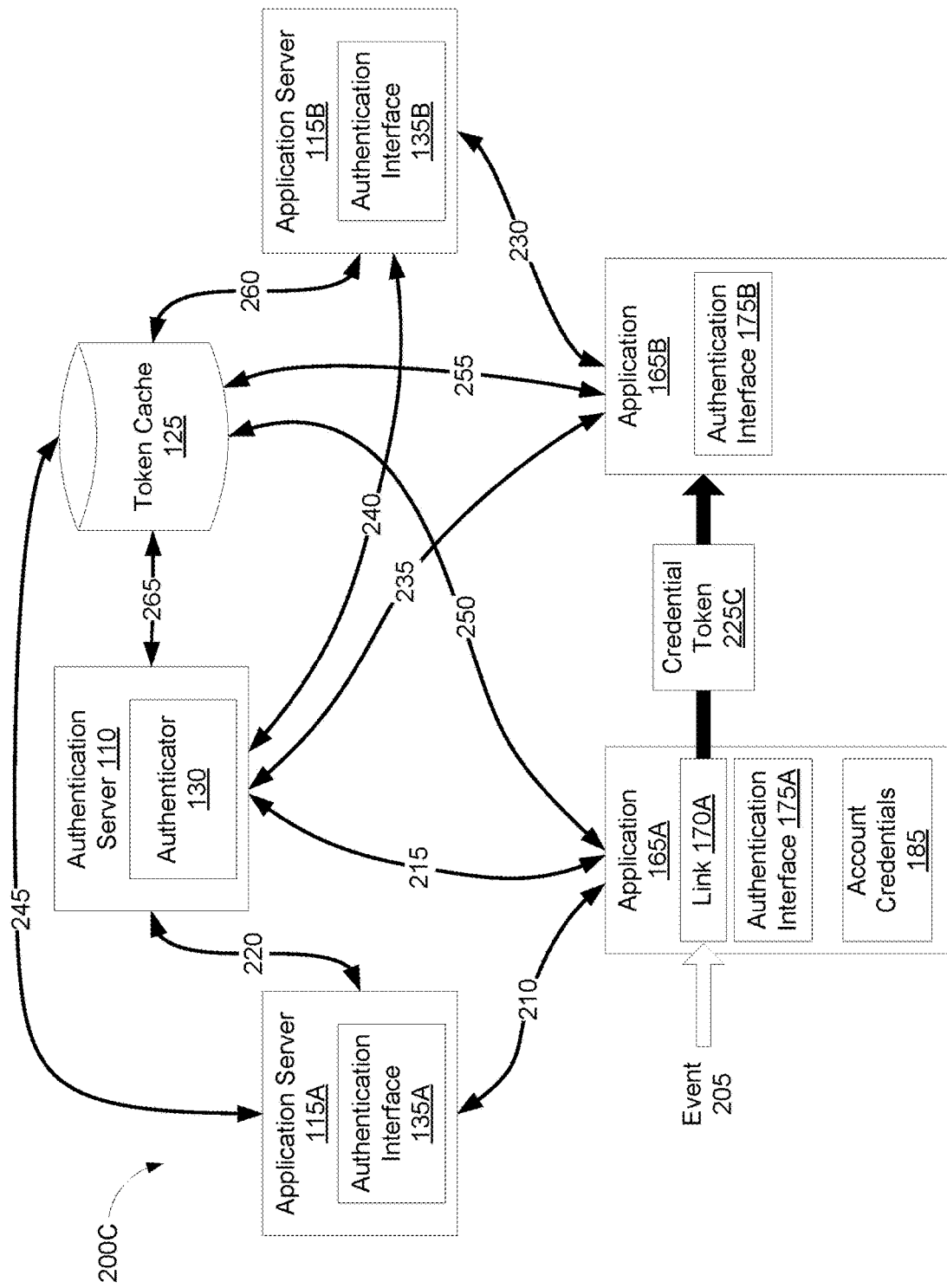

If the identified parameter type is the token corresponding to the account credentials 185, the original account credentials 185 may be retrieved using the token to complete the authentication process. Now referring to FIG. 2C, shown is an environment 200C for authenticating the account credentials 185 using a credential token 225C. The paths 210-265 may be communication links through the network 105. In the context of FIG. 1, the first application server 115A may have provided the application 165A to the client device 120 (via path 210). The first application 115A or the authentication server 110 may have provided the link 170A referencing the second application 165B (via path 210 or path 215). In some implementations, the account credentials 185 entered by the user of the client device 120 may be passed by the client-side authentication interface 175A to the first application server 115A (via path 210). The first server-side authentication interface 135A may then authenticate the account credentials 185 with the authentication server 110 (via path 220). The authenticator 130 of the authentication server 110 in turn may verify authentication of the account credentials 185 and may send a confirmation to the application server 115A (via path 220). In some implementations, the confirmation message may be in the form of a response packet. The first authentication interface 135A of the application server 115A in turn may send the confirmation to the first application 165A (via path 210). In some implementations, the first application 165A of the client device 120 can send the account credentials 185 directly to the authentication server 110 (via path 215). The authenticator 130 of the authentication server 110 in turn can verify the authentication of the account credentials 185 and return a confirmation of authentication (via path 215).

In some implementations, the authenticator 130 of the authentication server 110 can generate the credential token 225C for the account credentials 185, and may store the account credentials 185 for the token cache 125 (via path 265). In some implementations, the server-side authentication interface 135A can generate the credential token 225C for the account credentials 185, and may store the account credentials 185 for the token cache 125 (via path 245). In some implementations, the client-side authentication interface 175A of the first application 165A can generate the credential token 225C for the account credentials 185, and may store the account credentials 185 for the token cache 125 (via path 250). The credential token 225C may be used to reference or identify the account credentials 185 for further authentication by other applications 165B-165N, such as the second application 165B.

In response to an event 205 on the link 170A on the first application 165A, the parameter transferrer 190 can pass the credential token 225C generated from the account credentials 185 to the second application 165B via URL parameter or via function call. Once received by the second application 165B, the client-side authentication interface 175B can send the credential token 225C to the second application server 115B that manages the second application 165B (via path 235). The server-side authentication 135B of the second application server 115B can in turn send the credential token 225C with the authentication server 110 for authentication (via path 240). Having received the credential token 225C from the second application server 115B, the authentication server 110 can retrieve the account credentials 185 from the token cache 125 (via path 265). The authenticator 130 of the authentication server 110 can then compare the authentication credential 185 with the account credential stored for the account identifier to determine whether there is a match. If there is a match, the authenticator 130 of the authentication server 110 can send a confirmation message to the server-side authentication interface 135B of the second application server 115B (via path 240). In some implementations, the confirmation message may be in the form of a response packet. The server-side authentication interface 135B of the second application server 115B can in turn send the confirmation to the second application 165B (via path 235). On the other hand, if there is no match, the authenticator 130 of the authentication server 110 can send an indication of failure to the server-side authentication interface 135B of the second application server 115B (via path 240). The server-side authentication interface 135B of the second application server 115B can in turn send the indication of failure to the second application 165B (via path 235).

In some implementations, the client-side authentication interface 175B can in turn send the credential token 225C to the authentication server 110 (via path 240). Having received the credential token 225C from the second application 165B, the authentication server 110 can retrieve the account credentials 185 from the token cache 125 (via path 265). The authentication server 110 can then compare the authentication credentials 185 with the account credential stored for the account identifier to determine whether there is a match. If there is a match, the authenticator 130 of the authentication server 110 can send a confirmation message to the server-side authentication interface 135B of the second application 165B (via path 235). In some implementations, the confirmation message may be in the form of a response packet. On the other hand, if there is no match, the authenticator 130 of the authentication server 110 can send an indication of failure to the authentication interface 175B of the second application 165B (via path 235). In some implementations, the indication of failure may be in the form of a response packet.

In some implementations, the client-side authentication interface 175A-175N can transmit the credential token 225C to the authentication server 110 directly (via path 230). The authenticator 130 in turn can retrieve the account credentials 185 stored on the token cache 125 using the credential token 225C received from the second application 165B (via path 265). Having recovered the account credentials 185, the authentication server 110 can compare the authentication credentials 185 with the account credential stored for the account identifier to determine whether there is a match. If there is a match, the authenticator 130 of the authentication server 110 can send a confirmation message to the client-side authentication interface 175B of the second application 165B (via path 230). In some implementations, the confirmation message may be in the form of a response packet. On the other hand, if there is no match, the authenticator 130 of the authentication server 110 can send an indication of failure to the client-side authentication interface 175B of the second application 165B (via path 230). In some implementations, the indication of failure may be in the form of a response packet.

In some implementations, the client-side authentication interface 175A-175N can use the credential token 225C to retrieve the account credentials 225C from the remote token cache 125 (via path 255). In some implementations, the client-side authentication interface 175A-175N can use the credential token 225C to retrieve the account credentials 225C from the local token cache 195. Using the account credentials 185 recovered from the remote token cache 125 or the local token cache 195, the authentication interface 175B can send the account credentials 185 to the authentication server 110 (via path 235). The authentication server 110 can then compare the authentication credentials 185 with the account credential stored for the account identifier to determine whether there is a match. If there is a match, the authenticator 130 of the authentication server 110 can send a confirmation message to the server-side authentication interface 135B of the second application 165B (via path 235). In some implementations, the confirmation message may be in the form of a response packet. On the other hand, if there is no match, the authenticator 130 of the authentication server 110 can send an indication of failure to the authentication interface 175B of the second application 165B (via path 235). In some implementations, the indication of failure may be in the form of a response packet.

In some implementations, using the account credentials 185 recovered from the remote token cache 125 or the local token cache 195, the authentication interface 175B of the second application 165B can send the account credentials 185 to the second application server 115B (via path 235). The server-side authentication interface 135B of the second application server 115B can in turn send the account credentials 185 to the authentication server 110 (via path 240). The authentication server 110 can then compare the authentication credentials 185 with the account credential stored for the account identifier to determine whether there is a match. If there is a match, the authenticator 130 of the authentication server 110 can send a confirmation message to the server-side authentication interface 135B of the second application server 165B (via path 230). The server-side authentication interface 135B of the second application server 115B can in turn send the confirmation to the second application 165B (via path 235). In some implementations, the confirmation message may be in the form of a response packet. On the other hand, if there is no match, the authenticator 130 of the authentication server 110 can send an indication of failure to the server-side authentication interface 135B of the second application server 115B (via path 235). In some implementations, the indication of failure may be in the form of a response packet. The server-side authentication interface 135B of the second application server 115B can in turn send the confirmation to the second application 165B (via path 230).

Returning to FIG. 1, the confirmation of authentication may be received by the application 165A-165N referenced by the link 170A-170N from the authentication server 110 or via any of the application servers 115A-115N. The confirmation of authentication may include account settings particular to the account credentials 185 from the previously logged-in application 165A-165N (e.g., the first application 165A). Upon receipt of confirmation, the application 165A-165N referenced by the link 170A-170N may perform full or partial login. The parsing and interpretation of the confirmation message by the application 165A-165N may be performed using an application programming interface. Under full login, the application 165A-165N referenced by the link 170A-170N may automatically apply the account settings of the account credentials 185. In this manner, passing the account parameter from one application 165A-165N to the other application 165A-165N in this manner may allow for seamless transition and authentication, thereby addressing privacy and security concerns. Under partial login, the application 165A-165N referenced by the link 170A-170N can open a login prompt with the account credentials automatically filled in. Responsive to a positive response to the login prompt, the application 165A-165N referenced by the link 170A-170N can continue execution of the application 165A-165N. If on the other hand an indication of failure is received, the application 165A-165N referenced by the link 170A-170N can continue execution. The continuation of execution may be without the account settings particular to the account credentials 185, as there was a failure to authenticate with the application 165A-165N referenced by the link 170A-170N. The parsing and interpretation of the indication of failure by the application 165A-165N may be performed using an application programming interface. In some implementations, the application 165A-165N referenced by the link 170A-170N can display a prompt indicating failure to authenticate.

Figure 3A:
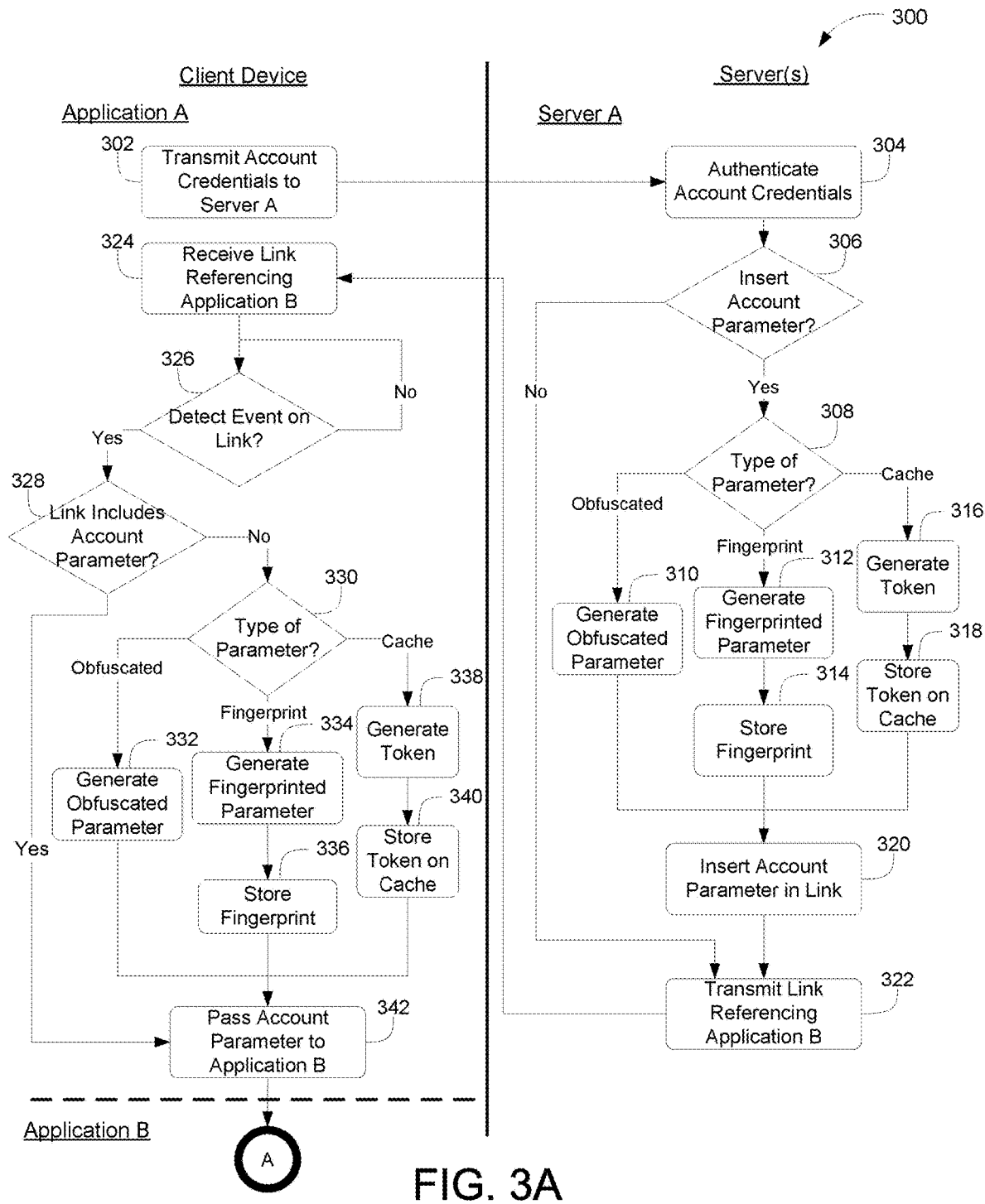
FIGS. 3A and 3B are flow diagrams depicting a method of passing account authentication information via parameters, according to an illustrative implementation.
Figure 3B:
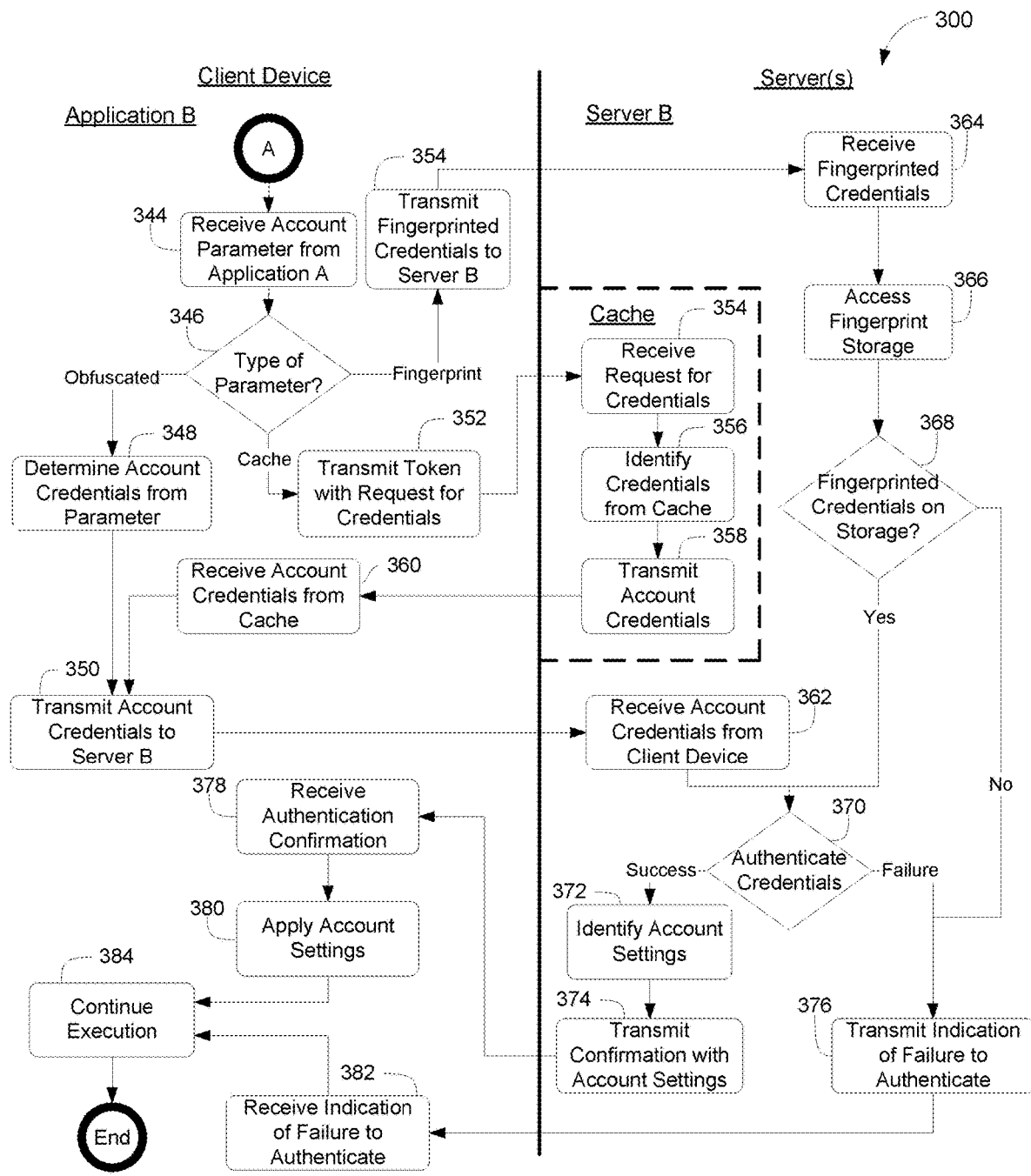
Figure 5:
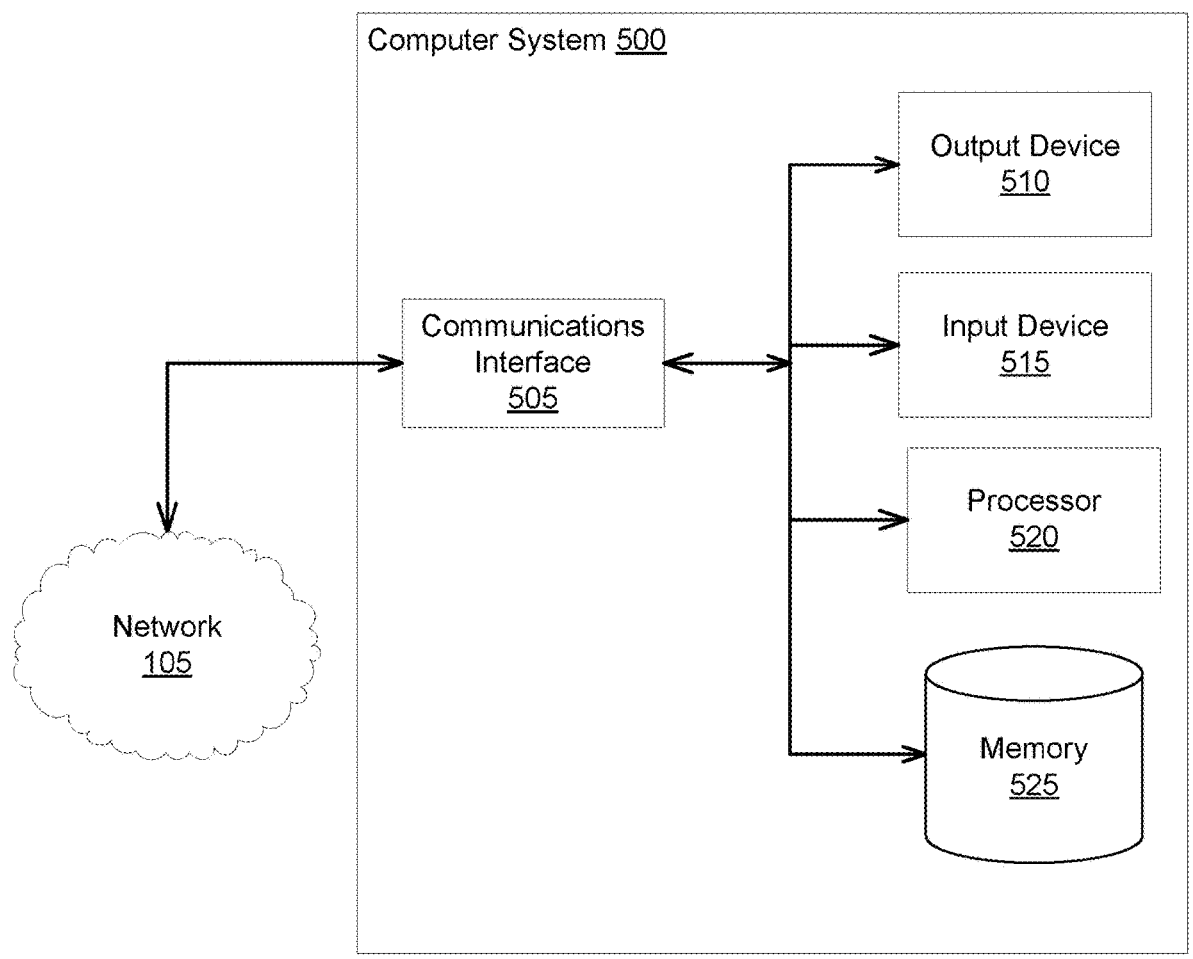
FIG. 5 is a block diagram illustrating a general architecture for a computer system that may be employed to implement elements of the systems and methods described and illustrated herein, according to an illustrative implementation.

Now referring to FIGS. 3A and 3B, depicted is a flow diagram a method 300 of passing account authentication information via parameters. The functionality described herein with respect to method 300 can be performed or otherwise executed by the system 100 as shown on FIG. 1, systems 200A-200C as shown in FIGS. 2A-2C, or a computing device as shown in FIG. 5 or any combination thereof. In some implementations, the functionalities of method 300 may be split between the client device 120, the authentication server 110, and any of the application servers 115A-115N.

In further detail, at step 302, a first application (Application A) executing on a client device can transmit account credentials to a first server (Server A). At step 304, the first server can receive the account credentials from the client device and can authenticate the account credentials. At step 306, the first server can determine whether to insert an account parameter into a link for the first application. The determination may be in accordance to a policy or may be particularized to the application (e.g., the first application).

If the first server determines that the account parameter is to be inserted, at step 308, the first server can determine which type of parameter. If the type of parameter is obfuscated, at step 310, the first server can generate an obfuscated parameter by applying a two-way encryption algorithm on the account credentials. If the type of parameter is fingerprint, at step 312, the first server can generate a fingerprinted parameter by applying a one-way encryption algorithm on the account credentials. At step 314, the first server can then store the fingerprint. If the type of parameter is cache, at step 316, the first server can generate a credential token for identifying the account credentials. At step 318, the first server can store the credential token on a remote cache. At step 320, the first server can insert the account parameter into the link for first application. At step 322, the first server can transmit the link referencing a second application (Application B) for the first application to the client device.

At step 324, the first application executing on the client device can receive the link referencing the second application. At step 326, the first application can monitor for an event on the link. If there is an event on the link, at step 328, the first application can determine whether the link includes the account parameter. If the link does not include a link, at step 330, the first application can determine which type of parameter to use. The determination may be in accordance to a policy or may be particularized to the application (e.g., the first application). If the type of parameter is obfuscated, at step 332, the first application can generate an obfuscated parameter by applying a two-way encryption algorithm on the account credentials. If the type of parameter is fingerprint, at step 334, the first application can generate a fingerprinted parameter by applying a one-way encryption algorithm on the account credentials. At step 336, the first application can then store the fingerprint. If the type of parameter is cache, at step 338, the first application can generate a credential token for identifying the account credentials. At step 340, the first application can store the credential token on a local cache. At step 342, the first application can pass the account parameter to the second application (using URI protocol or a function call).

At step 344, the second application can receive the account parameter from the first application. At step 346, the second application can determine which type of parameter is used. If the parameter type is obfuscated, at step 348, the second application can recover the account credentials from the account parameter by applying the two-way encryption algorithm. If the parameter type is cache, at step 352, the second application can transmit the token with request for the account credentials. At step 354, the cache (local or remote) can receive the request for account credentials. At step 356, the cache can identify the account credentials. At step 358, the cache can transmit the account credentials to the second application. At step 360, the second application can receive the account credentials from the cache. If the parameter type is obfuscated or cache, at step 350, the second application can transmit the account credentials to the second server (Server B) for authentication. At step 362, the second server can receive the account credentials from the second application. The second server can then proceed to authenticate the account credentials at step 370.

If the parameter type is fingerprint, at step 354, the second application can transmit the fingerprinted credentials to the second server. At step 364, the second server can receive the fingerprinted credentials from second application. At step 366, the second server can access the fingerprint storage to compare with the finger credentials received from the second application. At step 368, the second server can determine whether the fingerprinted credentials are on storage. If the fingerprinted credentials are on storage, the second server can proceed to authenticate at step 370.

If successful, at step 372, the second server can identify the account settings. At step 374, the second server can transmit a confirmation with the account settings. At step 378, the second application can receive the authentication confirmation from the second server. At step 380, the second application can apply the account settings associated with the account credentials used to authenticate with the first application. On the other hand, if not successful, at step 376, the second server can transmit an indication of failure to authenticate. At step 382, the second application can receive the indication of failure to authenticate. At step 384, the second application can continue execution.

Figure 4:
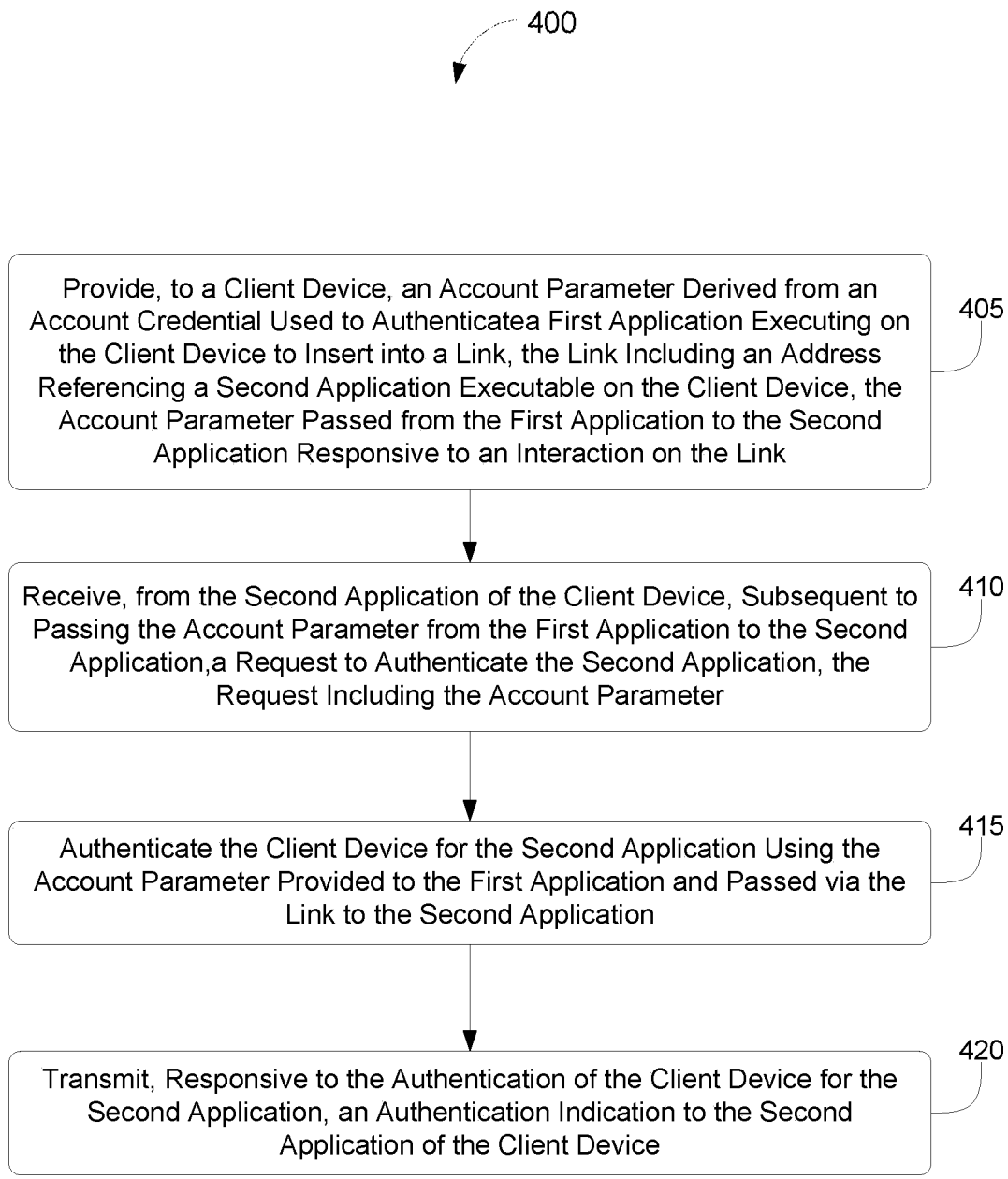
FIG. 4 is a flow diagram depicting a method of passing account authentication information via parameters, according to an illustrative implementation

Now referring to FIG. 4, depicted is a flow diagram a method 400 of passing account authentication information via parameters. The functionality described herein with respect to method 400 can be performed or otherwise executed by the system 100 as shown on FIG. 1, systems 200A-200C as shown in FIGS. 2A-2C, or a computing device as shown in FIG. 5 or any combination thereof. In some implementations, the functionalities of method 400 may be split between the client device 120, the authentication server 110, and any of the application servers 115A-115N. In brief overview, an authentication server can provide, to a client device, an account parameter derived from an account credential used to authenticate a first application executing on the client device to insert into a link (ACT 405). The authentication server can receive, from the second application of the client device, subsequent to passing the account parameter from the first application to the second application, a request to authenticate the second application (ACT 410). The authentication server can authenticate the client device for the second application using the account parameter provided to the first application and passed via the link to the second application (ACT 415). The authentication server can transmit, responsive to the authentication of the client device for the second application, an authentication indication to the second application of the client device (ACT 420).

An authentication server can provide, to a client device, an account parameter derived from an account credential used to authenticate a first application executing on the client device to insert into a link (ACT 405). The link can include an address referencing a second application executable on the client device. The account parameter can be passed from the first application to the second application responsive to an interaction on the link. In some implementations, authentication server can generate the account parameter based on the account credential used to authenticate the first application executing on the client device. The account parameter derived from the account credential using a one-way or a two-way encryption algorithm. The account parameter may be inserted or included into the link. In some implementations, the account parameter can be passed from the first application to the second application responsive to the interaction on the link via a link parameter of the link or a function call by a platform application running on the client device.

The authentication server can receive, from the second application of the client device, subsequent to passing the account parameter from the first application to the second application, a request to authenticate the second application (ACT 410). The request to authenticate can include the account parameter. In some implementations, the authentication server can receive the request to authenticate from the client device via an application server associate with the second application. In some implementations, the request to authenticate can include account credentials. The account credentials can include an account identifier, an account access code, and other encryption parameters, among others.

The authentication server can authenticate the client device for the second application using the account parameter provided to the first application and passed via the link to the second application (ACT 415). In some implementations, the authentication server can recover the account credentials by applying the two-way encryption algorithm to the account parameter included in the request to authenticate. In some implementations, the authentication server can authenticate the client device for the second application by determining that the account credentials recovered using the two-way encryption algorithm matches the original account credentials. In some implementations, the authentication server can authenticate the client device for the second application by determining that the account parameter included in the request matches the account parameter separately derived using the one-way encryption algorithm matches. In some implementations, the authentication server can authenticate the client device for the second application by determining that the account parameter included in the request to authenticate matches the account parameter stored in a cache. The cache may be a database associated with the authentication server.

The authentication server can transmit, responsive to the authentication of the client device for the second application, an authentication indication to the second application of the client device (ACT 420). In some implementations, the authentication indication can include an indication whether the authentication of the client device for the second appliance was successful or failure. In some implementations, the authentication indication can include account settings for the client device to apply to the second appliance.

FIG. 5 shows the general architecture of an illustrative computer system 500 that may be employed to implement any of the computer systems discussed herein (including the authentication server 110 and its components, the application server 115A-115B and its components, and the client device 120 and its components) in accordance with some implementations. The computer system 500 can be used to provide information via the network 105 for display. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in the authentication server 110 or the other components of the authentication server 110. The processors 520 can be included in the application server 115A-115B or the other components of the application server 115A-115B. The processors 520 can be included in the client device 120 or the other components of the client device 120.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the authentication server 110 can include the memory 525 to store information related to the availability of inventory of one or more content units, reservations of one or more content units, among others. The memory 525 can include the database 150. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or made to control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to or receive information from other devices (e.g., other computer systems). While not shown explicitly in the system of FIG. 1 or FIG. 5, one or more communications interfaces facilitate information flow between the components of the system 500. In some implementations, the communications interface(s) may be configured (e.g., via various hardware components or software components) to provide a website as an access portal to at least some aspects of the computer system 500. Examples of communications interfaces 505 include user interfaces (e.g., webpages), through which the user can communicate with the authentication server 110.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable a receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, or other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In some implementations, the features may be implemented on a laptop computer or other personal computer, a smartphone, other mobile phone, handheld computer, a tablet PC, or other computing device. In some implementations, the features disclosed herein may be implemented on a wearable device or component (e.g., smart watch) which may include a processing module configured to integrate internet connectivity (e.g., with another computing device or the network 105).

The operations described in this specification can be implemented as operations performed by a data processing apparatus on data stored on one or more computer-readable storage devices or on data received from other sources.

The terms "data processing apparatus", "data processing system", "user device" or "computing device" encompasses all kinds of apparatuses, devices, and machines for processing data, including by way of example a programmable processor, a computer, a system on a chip or multiple chips, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The authenticator 130 and the authentication interfaces 135A-135N can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from read-only memory or random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can include any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 500 or system 100 can include clients and servers. For example, the authentication server 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. The authenticator 130 and the authentication interfaces 135A-135N can be part of the authentication server 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to passing account authentication information via parameters and deploying countermeasures thereto, the systems and methods described herein can include applied to other environments. The foregoing implementations are illustrative rather than limiting of the described systems and methods. The scope of the systems and methods described herein is thus indicated by the appended claims, rather than the foregoing description, and changes that come within the meaning and range of equivalency of the claims are embraced therein.

What is claimed is:

1. A method for passing authentication information, the method comprising:
    transmitting, by one or more processors of a client device to one or more servers, an account credential used to authenticate a first application;
    receiving, by the one or more processors from the one or more servers, a link referencing a second application executing on the client device;
    detecting, by the one or more processors, an interaction with the link;
    obtaining, by the one or more processors, an account parameter generated using the account credential; and
    passing, by the one or more processors, the account parameter to the second application, to cause the second application to request authentication from the one or more servers based on the account parameter.

2. The method of claim 1, wherein obtaining the account parameter includes receiving the account parameter in the link, from the one or more servers.

3. The method of claim 1, obtaining the account parameter includes:
    determining that the link does not include the account parameter; and
    generating the account parameter using the account credential.

4. The method of claim 3, further comprising:
    determining, by the one or more processors, a type of the account parameter; and
    in response to determining that the type is obfuscated, generating an obfuscated parameter using two-way encryption of the account credential, the account parameter including the obfuscated parameter.

5. The method of claim 3, further comprising:
    determining, by the one or more processors, a type of the account parameter; and
    in response to determining that the type is fingerprint:
        generating a fingerprint parameter using one-way encryption of the account credential, the account parameter including the fingerprint parameter, and
        storing the fingerprint parameter in a memory.

6. The method of claim 3, further comprising:
    determining, by the one or more processors, a type of the account parameter; and
    in response to determining that the type is cache:
        generating a credential token for identifying the account credential, the account parameter including the credential token, and
        storing the credential token in a cache.

7. The method of claim 1, wherein passing the account parameter to the second application includes using a Uniform Resource Locator (URI) protocol.

8. The method of claim 1, wherein passing the account parameter to the second application includes using a function call.

9. A method for obtaining authentication information, the method comprising:
    obtaining, by one or more processors of a client device from a first application executing on the client device, an account parameter used to authenticate the first application;
    determining, by the one or more processors and based on the account parameter, an account credential;

transmitting, by the one or more processors to a server, the account credential; and in response to receiving, from the server, authentication confirmation based on the account credential, applying, by the one or more processors, account settings to continue execution of a second application.

10. The method of claim 9, wherein determining the account credential includes:

determining, by the one or more processors, a type of the account parameter; and in response to determining that the type is obfuscated, transmitting an obfuscated account credential to the server.

11. The method of claim 9, wherein determining the account credential includes:

determining, by the one or more processors, a type of the account parameter; and in response to determining that the type is fingerprint, transmitting a fingerprinted account credential to the server.

12. The method of claim 9, wherein determining the account credential includes:

determining, by the one or more processors, a type of the account parameter; and in response to determining that the type is cache, retrieving the account credential from the cache.

13. A method of passing account authentication information via parameters, the method comprising:

receiving, by one or more processors of one or more servers and from a client device, an account credential used to authenticate a first application executing on the client device;

generating, by the one or more processors, an account parameter based on the account credential; and providing, by the one or more processors and to the client device, the account parameter to insert into a link, wherein the link includes an address referencing a second application executable on the client device and is configured to cause the client device to pass the account parameter passed from the first application to the second application responsive to an interaction on the link.

14. The method of claim 13, further comprising:

receiving, by the one or more processors, from the second application of the client device, subsequent to passing the account parameter from the first application to the second application, a request to authenticate the second application, the request including the account parameter;

authenticating, by the one or more processors, the client device for the second application using the account parameter provided to the first application and passed via the link to the second application; and transmitting, by the one or more processors, based on authenticating the client device for the second application, an authentication indication identifying one of success or failure of authentication of the client device for the second application.

15. The method of claim 14, wherein the authentication indication identifies success of authentication, and the method further comprises performing a full or partial login to an account on the second application using the account parameter.

16. The method of claim 14, wherein the authentication indication identifies failure of authentication, and the second application is executed without using the account parameter to perform a full or partial login to an account of the second application.

17. The method of claim 14, wherein providing the account parameter further comprises providing the account parameter derived from the account credential using a two-way encryption algorithm; and wherein authenticating the client device for the second application further comprises recovering the account credential by applying the two-way encryption algorithm to the account parameter included in the request to authenticate.

18. The method of claim 14, wherein providing the account parameter further comprises providing the account parameter derived from the account credential using a one-way encryption algorithm; and wherein authenticating the client device for the second application further comprises determining that a second account parameter separately derived from the account credential using the one-way encryption algorithm matches the account parameter included in the request to authenticate.

19. The method of claim 14, wherein authenticating the client device for the second application further comprises determining that the account parameter included in the request to authenticate matches the account parameter stored in a cache.

* * * * *